US012783608B2

(12) United States Patent
Andre et al.

(10) Patent No.: US 12,783,608 B2
(45) Date of Patent: Nov. 3, 2026

(54) GENERATING CROSS-DOMAIN GUIDANCE FOR NAVIGATING HCI'S

(71) Applicant: X Development LLC, Mountain View, CA (US)

(72) Inventors: David Andre, San Francisco, CA (US); Yu-Ann Madan, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 1086 days.

(21) Appl. No.: 17/841,022

(22) Filed: Jun. 15, 2022

(65) Prior Publication Data

US 2023/0409677 A1 Dec. 21, 2023

(51) Int. Cl.

| | |
|---|---|
| ***G06F 18/2415*** | (2023.01) |
| ***G06F 18/2137*** | (2023.01) |
| ***G06F 18/22*** | (2023.01) |
| ***G06N 7/01*** | (2023.01) |

(52) U.S. Cl.

CPC .... *G06F 18/2415* (2023.01); *G06F 18/21375* (2023.01); *G06F 18/22* (2023.01); *G06N 7/01* (2023.01)

(58) Field of Classification Search

None

See application file for complete search history.

(56) References Cited

U.S. PATENT DOCUMENTS 8,775,332 B1 7/2014 Morris et al.
9,697,200 B2 * 7/2017 Sarikaya .................. G06F 40/40
9,909,878 B2 * 3/2018 Beaurepaire ........... G01C 21/20
10,984,784 B2 * 4/2021 Kuczmarski ........ G06F 16/3329
11,099,719 B1 8/2021 Thompson et al.
11,249,736 B2 2/2022 Huang et al.

(Continued)

FOREIGN PATENT DOCUMENTS

JP 2017062647 3/2017
JP 2019028947 2/2019

OTHER PUBLICATIONS

Todi et al., "Adapting User Interfaces with Model-based Reinforcement Learning" arXiv:2103.06807v1 [cs.HC] 13 pages, dated Mar. 11, 2021.

(Continued)

*Primary Examiner* — Maikhanh Nguyen
(74) *Attorney, Agent, or Firm* — Gray Ice Higdon

(57) ABSTRACT

Disclosed implementations relate to automatically generating and providing guidance for navigating HCIs to carry out semantically equivalent/similar computing tasks across different computer applications. In various implementations, a domain of a first computer application that is operable using a first HCI may be used to select a domain model that translates between an action space of the first computer application and another space. Based on the selected domain model, a domain-agnostic action embedding—representing actions performed previously using a second HCI of a second computer application to perform a semantic task—may be processed to generate probability distribution(s) over actions in the action space of the first computer application. Based on the probability distribution(s), actions may be identified that are performable using the first computer application—these actions may be used to generate guidance for navigating the first HCI to perform the semantic task.

20 Claims, 6 Drawing Sheets

(56) References Cited

U.S. PATENT DOCUMENTS

| | | | | |
|---|---|---|---|---|
| 11,263,241 | B2 * | 3/2022 | Rezaeian | G06F 16/285 |
| 11,393,456 | B1 * | 7/2022 | Guo | G06N 3/09 |
| 11,442,992 | B1 * | 9/2022 | Moon | G06N 3/094 |
| 11,532,301 | B1 * | 12/2022 | Hajebi | G06F 40/35 |
| 11,743,378 | B1 * | 8/2023 | Johnston | H04M 3/5315 704/270.1 |
| 2005/0054381 | A1 | 3/2005 | Lee et al. | |
| 2012/0257904 | A1 | 10/2012 | Nishimura | |
| 2016/0203125 | A1 * | 7/2016 | Sarikaya | G06F 40/35 704/9 |
| 2020/0125586 | A1 | 4/2020 | Rezaeian | |
| 2020/0320984 | A1 * | 10/2020 | Kuczmarski | G06N 20/00 |
| 2020/0410392 | A1 | 12/2020 | Verma et al. | |
| 2021/0334320 | A1 * | 10/2021 | Faust | G06N 3/0985 |
| 2021/0397942 | A1 * | 12/2021 | Collomosse | G06N 3/0464 |
| 2022/0050661 | A1 * | 2/2022 | Lange | G06V 20/00 |

OTHER PUBLICATIONS

Romero et al., “A Long-Term Evaluation of Adaptive Interface Design for Mobile Transit Information” MobileHCI ’20, Oct. 5-8, 2020, Oldenburg, Germany. ACM ISBN 978-1-4503-7516-0/20/10. https://doi.org/10.1145/3379503.3403536.

Weld et al., “Automatically Personalizing User Interfaces” Department of Computer Science & Engineering, University of Washington. 7 pages.

Lopez-Jaquero et al., “Towards an Extended Model of User Interface Adaptation: The Isatine Framework” EIS 2007, LNCS 4940, pp. 374-392, 2008. Springer-Verlag Berlin Heidelberg.

Abrahao et al., “Model-based intelligent user interface adaptation: challenges and future directions” Software and Systems Modeling (2021) 20:1335-1349. https://doi.org/10.1007/s10270-021-00909-7, dated Jul. 16, 2021.

Reguera-Bakhache et al., “An Adaptive Industrial Human-Machine Interface to Optimise Operators Working Performance” 2021 IEEE/ASME International Conference on Advanced Intelligent Mechtronics (AIM), 7 pages.

European Patent Office; International Search Report and Written Opinion issued in Application No. PCT/US2023/025065; 12 pages; dated Sep. 18, 2023.

Japanese Patent Office, Office Action issued in Application No. 2024-571301, 6 pages, dated Jan. 5, 2026.

Korean Patent Office; Office Action issued in Application No. KR10-2024-7043277, 14 pages, dated Jul. 20, 2026.

* cited by examiner

400

GENERATING CROSS-DOMAIN GUIDANCE FOR NAVIGATING HCI'S

BACKGROUND

Individuals often operate computing devices to perform semantically similar tasks in different contexts. For example, an individual may engage in a sequence of actions using a first computer application to perform a given semantic task, such as setting various application preferences, retrieving/viewing particular data that is made accessible by the first computer application, performing a sequence of operations within a particular domain (e.g., 3D modeling, graphics editing, word processing), and so forth. The same individual may later engage in a semantically similar, but syntactically distinct, sequence of actions to perform a semantically equivalent task (e.g., the same semantic task) in a different context, such as while using a second computer application. However, the individual may be less familiar with the second computer application, and consequently, may not be able to perform the semantic task.

SUMMARY

Implementations are described herein for automatically generating and providing guidance for navigating human-computer interfaces (HCIs) to carry out semantically equivalent and/or semantically similar computing tasks across different computer applications. More particularly, but not exclusively, implementations are described herein for enabling individuals (often referred to as "users") to leverage actions they perform within one context, e.g., while carrying out semantic task(s), in order to generate guidance for carrying out semantically equivalent or semantically similar task(s) in other contexts. In various implementations, the captured actions may be abstracted as an "action embedding" in a generalized "action embedding space." This domain-agnostic action embedding may represent, in the abstract, a "semantic task" that can be translated into action spaces of any number of domains using respective domain models. Put another way, a "semantic task" is a domain-agnostic, higher order task which finds expression within a particular domain as a sequence/plurality of domain-specific actions.

In some implementations, a method may be implemented using one or more processors and may include: identifying a first domain of a first computer application that is operable using a first human-computer interface (HCI); based on the identified domain, selecting a domain model that translates between an action space of the first computer application and another space; based on the selected domain model, processing an action embedding to generate one or more probability distributions over actions in the action space of the first computer program, wherein the action embedding represents a plurality of actions performed previously using a second HCI of a second computer application to perform a semantic task; based on the one or more probability distributions, identifying a second plurality of actions that are performable using the first computer application; and causing output to be presented at one or more output devices. In various implementations, the output may include guidance for navigating the first HCI to perform the semantic task using the first computer application, and wherein the guidance is based on the identified second plurality of actions that are performable using the first computer application.

In various implementations, the domain model may be trained to translate between the action space of the first computer program and a domain-agnostic action embedding space. In various implementations, the domain model may be trained to translate directly between the action space of the first computer program and an action space of the second computer program.

In various implementations, the first HCI may take the form of a graphical user interface. In various implementations, the guidance for navigating the first HCI may include one or more visual annotations that overlay the GUI. In various implementations, one or more of the visual annotations may be rendered to call attention to one or more graphical elements of the GUI.

In various implementations, the guidance for navigating the first HCI may include one or more natural language outputs. In various implementations, the method may further include: obtaining user input that conveys the semantic task; and identifying the action embedding based on the semantic task. In various implementations, the user input may be natural language input, and the method may further include: performing natural language processing (NLP) on the natural language input to generate a first task embedding that represents the semantic task; and determining a similarity measure between the first task embedding and the action embedding; wherein the action embedding is processed based on the similarity measure.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
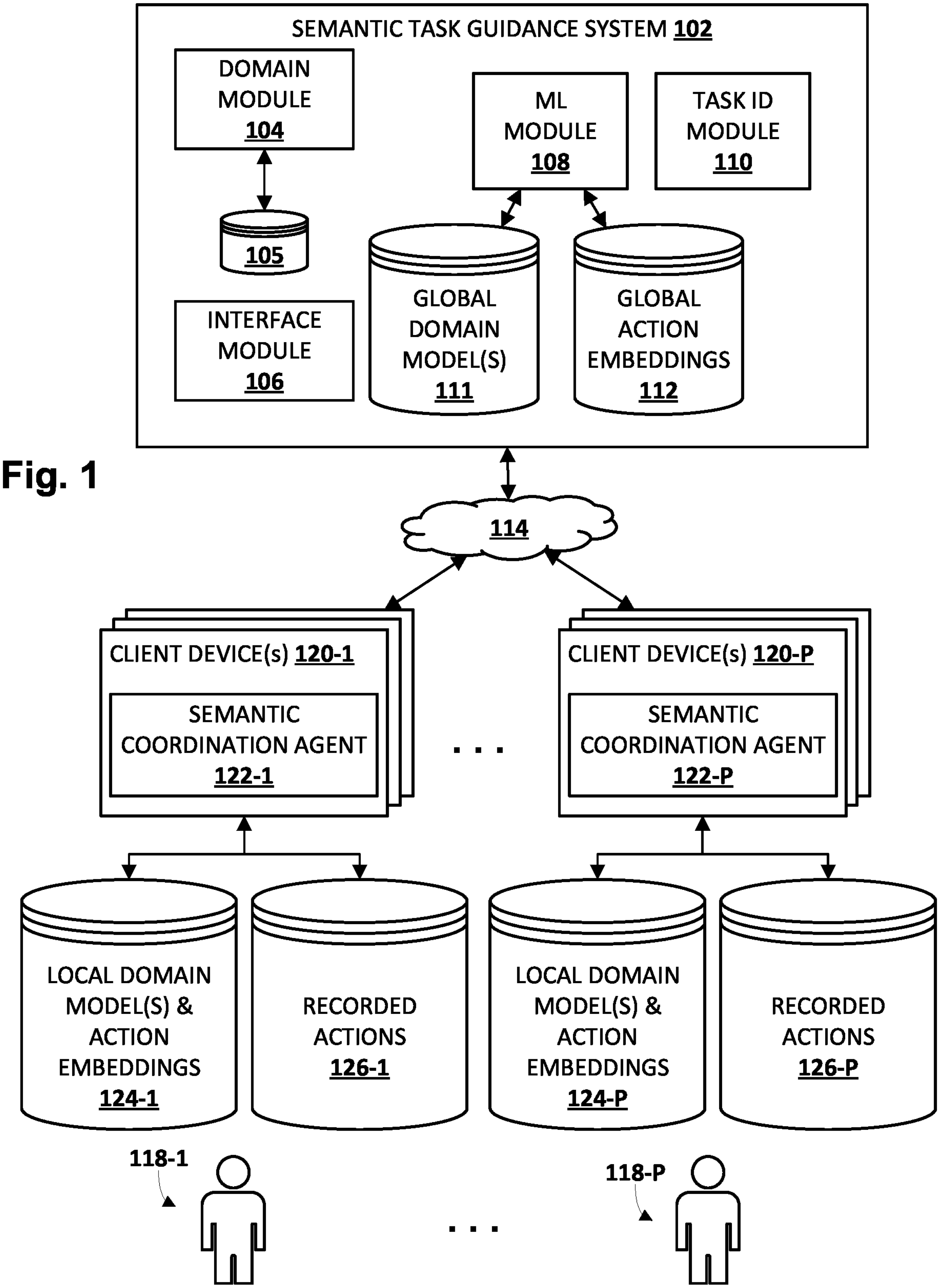
FIG. 1 is a schematic diagram of an example environment in which implementations disclosed herein may be implemented.

Implementations are described herein for automatically generating and providing guidance for navigating human-computer interfaces (HCIs) to carry out semantically equivalent and/or semantically similar computing tasks across different computer applications. More particularly, but not exclusively, implementations are described herein for enabling individuals (often referred to as "users") to leverage actions they perform within one context, e.g., while carrying out semantic task(s), in order to generate guidance for carrying out semantically equivalent or semantically similar task(s) in other contexts. In various implementations, the captured actions may be abstracted as an "action embedding" in a generalized "action embedding space." This domain-agnostic action embedding may represent, in the abstract, a "semantic task" that can be translated into action spaces of any number of domains using respective domain models. Put another way, a "semantic task" is a domain-agnostic, higher order task which finds expression within a particular domain as a sequence/plurality of domain-specific actions.

As one non-limiting working example, a user may authorize a local agent computer program (also referred to herein as an "agent" or "assistant") to monitor the user's interaction with one or more local computer applications. This monitoring may include, for instance, capturing interactions by the user with an HCI of a first computer application, such as a graphical user interface (GUI). The user may interact with the HCI to perform a variety of semantic tasks that can be carried out using the first computer application. Each semantic task may include a plurality of individual or atomic interactions with the HCI of the first computer application.

For example, if the first computer application is a three-dimensional (3D) design application, then a semantic task may include designing a 3D structure, and the atomic interactions may include, for instance, navigating to particular menus, selecting particular tools from those menus, selecting particular settings for those tools, operating those tools on a canvas, and so forth. If the first computer application is a spreadsheet application, the semantic task may include, for instance, creating a chart based on underlying data. The atomic interactions may include, for instance, sorting data, adding columns (e.g., with equations that utilize existing column values for operands), selecting ranges of navigating through menus, selecting particular items from those menus to create the desired chart, and so forth.

Referring back to the working example, domain-specific actions captured in association with a semantic task carried out using the first computer application may be abstracted into an action embedding using a domain model associated with the domain of the first computer application. This action embedding may then be translated into any number of other domain action spaces, such as an action space of a second computer program. For example, a probability distribution may be generated over actions in the action space of the second computer program. A plurality of domain-specific actions performable using the second computer program may be selected from the action space, e.g., based on their probabilities (e.g., generated using a softmax layer of the domain model). The selected domain-specific actions of the second computer program may then be used to generate guidance for navigating through an HCI provided by the second computer program.

Guidance for navigating an HCI may be generated and/or presented in various ways. In some implementations in which the HCI is a GUI, visual annotations may be presented, e.g., overlaying all or parts of the GUI. In some implementations, these visual annotations may draw attention to graphical elements that can be operated (e.g., using a pointer device or a finger if the display is a touchscreen) to carry out the plurality of domain-specific actions identified from the action space of the second computer program. Visual annotations may include, for instance, arrows, animation, natural language text, shapes, etc. Additionally or alternatively, audible guidance may be presented to audibly guide a user to specific graphical elements that correspond to the identified domain-specific actions from the action space of the second computer program. Audible guidance may include, for instance, natural language output, noises that accompany visual annotations (e.g., animations), etc.

Thus, with techniques described herein, a user may permit (e.g., by "opting in") an agent configured with selected aspects of the present disclosure to monitor these types of interactions with various HCIs in various domains. The knowledge gained by the agent may be captured (e.g., in various domain machine learning models) and leveraged to generate guidance for performing semantically similar actions in other domains. In some implementations, the extent to which other users follow, or stray from, such guidance subsequently may be used to train domain models, e.g., so that they can select "better" actions in the future. In some cases, if enough users follow the same (or substantially similar) guidance in a given computer application, that guidance may be used to create a tool that can be invoked automatically, saving subsequent users from having to repeat the same atomic actions provided in the guidance.

In some implementations, a user may provide a natural language input to describe a sequence of actions performed using an HCI in a first domain, e.g., while performing them, or immediately before or after. For example, while operating a first spreadsheet application, the user may state, "I'm creating a bar chart to show the last 90 days of net losses." A first task/policy embedding generated from natural language processing (NLP) of this input may be associated with (e.g., mapped to, combined with) a first action embedding generated from the captured sequence of actions using a first domain model associated with the first spreadsheet application. As noted previously, the first domain model may translate between an action space of the first spreadsheet and, for instance, a general action embedding space and/or one or more other domain-specific action embedding spaces.

Later, when operating a second spreadsheet application with similar functionality as the first spreadsheet application, the user may provide semantically similar natural language input to learn how to carry out a semantically equivalent (or at least semantically similar) task with the second spreadsheet application. For example, the user may utter, "How do I create a bar chart to show the last 120 days of net losses." The second task/policy embedding generated from this subsequent natural language input may be matched to the first task/policy embedding, and hence, the first action embedding. The first action embedding may then be processed using a second domain model that translates between the general action embedding space and an action space of the second spreadsheet application to identify action(s) that are performable at the second spreadsheet application to carry out the semantic task. These identified action(s) may be used to generate guidance for carrying out the semantic task in the second spreadsheet application.

For example, visual annotations and/or audible guidance may be provided to guide the user through the various menus, sheets, cells, etc. of the second spreadsheet application to carry out the creation of a bar chart showing net losses for the last 120 days. Notably, the fact that the second chart will show 120 days of losses, whereas the first chart showed 90 days of losses, can be handled by the agent, e.g., by preserving the number of days as a parameter associated with the actions in the action space of the second spreadsheet application. In addition to capturing the semantics of the HCI itself, the domain model may also be trained to identify where semantically equivalent data resides.

For example, when operating the first spreadsheet application to edit a first spreadsheet file, the data needed to determine net losses may be on a particular tab that also includes various other data. By contrast, a second spreadsheet that is editable using the second spreadsheet application may include semantically similar data, namely, data needed to determine net losses, on a different tab with or without other data. If sufficient training examples are provided over time, however, the domain models used by agents configured with selected aspects of the present disclosure may be capable of locating the proper data to determine net losses. For example, different columns across different spreadsheets that contain data relevant to net losses may include semantically similar column headings. Additionally or alternatively, the actual data itself may share semantic traits: it may be formatted similarly; have generally similar values (e.g., within the same order of magnitude, millions versus hundreds of millions, etc.); exhibit similar temporal patterns (e.g., higher sales during certain seasons), etc.

In addition to or instead of guidance, in some implementations, techniques described herein may be used to configure a HCI itself to conform to a particular users' behavior or abilities. For example, visual settings of a GUI may be configured via a variety of different actions to make the GUI easier to operate for visually impaired users. This may include, for instance, increasing font size, increasing contrast, decreasing how many menu items are presented (e.g., based on frequency of use across a population of users), increasing the size of operable graphical elements such as sliders, buttons, etc., activating user-accessibility settings as voice prompts, and so forth. These actions may be captured in a given computer application and abstracted into an action embedding, e.g., along with a task/policy embedding created from natural language input, such as "imposing visually-impaired settings."

Later, in a different context (e.g., when operating a different computer application), a user may provide natural language input such as "I'm visually impaired, please make this interface easier to operate." The action embedding generated previously may be processed using a domain model associated with the new context to automatically make at least some of the aforementioned adjustments, and/or show the user how to make them. If any of the adjustments are not available or applicable, the user may be notified as such, and/or may be provided with different recommendations that might satisfy a similar need.

Techniques described herein are not limited to generating guidance for carrying out semantic tasks across similar domains (e.g., from one spreadsheet application to another). In various implementations, guidance for carrying out semantic tasks may also be generated across semantically distinct domains/contexts. For example, semantically similar but domain-agnostic application parameters of various computer application(s) may be named, organized, and/or accessed differently (e.g., different submenus, command line inputs, etc.). Such application parameters may include, for instance, visual parameters that can be set to various modes such as a "dark mode"); application permissions (e.g., access to location, camera, files, other applications, etc.); or other application preferences (e.g., preference for Celsius versus Fahrenheit, metric versus imperial, preferred font, preferred sorting order, etc.). Many of these various application parameters may not be unique to a particular computer application or domain. In fact, some application parameters, such as "skins" that are applied to GUIs, may even be applicable to an operating system (OS).

The spreadsheet example described above included two different spreadsheet applications. However, this is not meant to be limiting. Techniques described herein may be performed to generate guidance for carrying out a semantic task across multiple different use cases within a single domain. Suppose a user operates a first "docket" spreadsheet to organize docketing and schedule data in a particular way and then generate a docket report in a particular format. The actions performed by the user to create this report may be captured and abstracted to an action embedding as described previously, e.g., using the domain model of whatever spreadsheet application the user is operating.

Later, the user may receive a second "docket" spreadsheet, e.g., created by a different docketing system or for a different entity. This second docket spreadsheet include semantically similar data as the first docket spreadsheet, but may be organized differently and/or have a different schema. Columns may have different names and/or be in a different order. Data may be expressed using different syntaxes (e.g., "MM/DD/YY" versus "DD/MM/YYYY"). Nonetheless, the action embedding created previously may be processed, e.g., in conjunction with the second docket spreadsheet (e.g., as additional context input data), to generate guidance for performing the same semantic task using the second docket spreadsheet. For example, the same domain model, or a separate domain model (e.g., trained in reverse) that can also process contextual input data, may be applied to identify actions that are performable to carry out the semantic task with the second docket spreadsheet.

In various implementations, domain models may be continuously trained based on how users interact with the guidance generated using techniques described herein. This may in turn affect how or whether various pieces of guidance are provided at all. Suppose for a particular domain-agnostic semantic action, such as "set to dark mode," a particular suggested action is rarely or never performed in a particular domain, e.g., using a particular computer application of that domain. Perhaps that computer application's native settings already address or render moot an underlying issue that necessitated that suggested action in other domains.

In such a scenario, the domain model associated with the particular domain may be further trained so that when the same (or similar) action embedding is processed, the resulting probability distribution over the action space of the domain will assign that suggested action a lower probability. By contrast, in other domains in which the underlying issue is still present, the suggested action may receive a greater probability. The assigned probability may dictate how the suggested action is presented to a user (e.g., how conspicuously, as an animation versus a small visual annotation, audibly or visually), when the suggested action is presented to the user (e.g., relative to other suggestions), whether the suggested action is presented to the user, or even if the action should be performed automatically without providing the user guidance.

The continued training of domain models is not limited to monitoring user feedback/reaction to HCI guidance provided in a new domain. In some implementations, domain models may be trained without the user leaving the original domain in which the semantic task is performed. For example, upon a user performing a sequence of actions with a computer application to complete a given semantic task, a domain model associated with the domain of the computer application may be used to process the actions (or data indicative thereof, such as embeddings) to generate a domain-agnostic embedding that semantically represents the given task. That domain-agnostic embedding may then be processed using a machine learning model (e.g., a sequence decoder) that is trained to generate natural language output that is intended to describe the given semantic task performed by the user. For instance, in response to changing particular visual settings in an application or operating system, natural language output such as "It looks like you changed your graphical interface to 'dark mode'" may be presented to the user.

This natural language output may be presented to the user, audibly or visually, along with a solicitation for the user's feedback ("Is that what you did?" or "Did I describe your actions accurately?"). The user's positive feedback ("yes, that's correct") or negative feedback ("no, that's not what I did") may be used to train the domain model, e.g., using techniques such as back propagation and gradient descent. Users may have the ability to adjust or influence how often (or even whether) such solicitations for feedback are presented to them. In some cases, users may be provided with incentives to be solicited for such feedback and/or to provide the feedback. These incentives may come in various forms, such as pecuniary rewards, credits related to the computer application (e.g., special items for a game), and so forth. Additionally or alternatively, the agent itself may self-modulate how often such feedback is solicited from a user, based on signals such as the user's reaction (e.g., dismissal versus cooperation), measures of accuracy associated with the domain model in question (more accurate models may not be trained as frequently as less accurate models), and so forth.

As used herein, a "domain" may refer to a targeted subject area in which a computing component is intended to operate, e.g., a sphere of knowledge, influence, and/or activity around which the computing component's logic revolves. In some implementations, domains may be identified by heuristically matching keywords in the user-provided input with domain keywords. In other implementations, the user-provided input may be processed, e.g., using NLP techniques such as word2vec, a Bidirectional Encoder Representations from Transformers (BERT) transformer, various types of recurrent neural networks ("RNNs," e.g., long short-term memory or "LSTM," gated recurrent unit or "GRU"), etc., to generate a semantic embedding that represents the user's input.

In various implementations, one or more domain models may have been generated previously for each domain. For instance, one or more machine learning models—such as an RNN (e.g., LSTM, GRU), BERT transformer, various types of neural networks, a reinforcement learning policy, etc.—may be trained based on a corpus of documentation associated with the domain. As a result of this training, one or more of the domain model(s) may be at least bootstrapped so that it is usable to process what will be referred to herein as an "action embedding" to select, from an action space associated with a target domain, a plurality of candidate computing actions that can then be used to provide guidance as described herein.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a semantic task guidance system 102, may be implemented using one or more server computing devices that form what is sometimes referred to as a "cloud infrastructure," although this is not required. In other implementations, aspects of semantic task guidance system 102 may be implemented on client devices 120, e.g., for purposes of preserving privacy, reducing latency, etc.

Semantic task guidance system 102 may include a number of different components configured with selected aspects of the present disclosure, such as a domain module 104, an interface module 106, a machine learning ("ML" in FIG. 1) module 108, and/or a task identification ("ID" in FIG. 1) module 110. Semantic task guidance system 102 may also include any number of databases for storing machine learning model weights and/or other data that is used to carry out selected aspects of the present disclosure. In FIG. 1, for instance, semantic task guidance system 102 includes a database 111 that stores global domain models and another database 112 that stores data indicative of global action embeddings.

Semantic task guidance system 102 may be operably coupled via one or more computer networks (114) with any number of client computing devices that are operated by any number of users. In FIG. 1, for example, a first user 118-1 operates one or more client devices 120-1. A pth user 118-P operates one or more client device(s) 120-P. As used herein, client device(s) 120 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor and/or touchscreen display), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Domain module 104 may be configured to determine a variety of different information about domains that are relevant to a given user 118 at a given point in time, such as a domain in which the user 118 currently operates, domain(s) in which the user operated previously, domain(s) in which the user would like to extend semantic tasks or receive guidance about how to perform semantic tasks, etc. To this end, domain module 104 may collect contextual information about, for instance, foregrounded and/or backgrounded applications executing on client device(s) 120 operated by the user 118, webpages current/recently visited by the user 118, domain(s) in which the user 118 has access and/or accesses frequently, and so forth.

With this collected contextual information, in some implementations, domain module 104 may be configured to identify one or more domains that are relevant to a user currently. For instance, a request to record or observe a task performed by a user 118 using a particular computer application and/or on a particular input form may be processed by domain module 104 to identify the domain in which the user 118 performs the to-be-recorded task, which may be a domain of the particular computer application or input form. If the user 118 later requests guidance for performing the same task in a different target domain, e.g., using a different computer application or different input form, then domain module 104 may identify the target domain. The user need not request guidance in the different target domain. In some implementations, by simply operating the different computing application or input form, techniques described herein may be implemented to provide the user with unsolicited guidance on how to perform a similar semantic task as they performed previously in another domain.

In some implementations, domain module 104 may also be configured to retrieve domain knowledge from a variety of different sources associated with an identified domain. In some such implementations, this retrieved domain knowledge (and/or embedding(s) generated therefrom) may be provided to downstream component(s), e.g., in addition to the natural language input or contextual information mentioned previously. This additional domain knowledge may allow downstream component(s), particularly machine learning models, to be used to make predictions (e.g., generating guidance to perform semantic tasks across different domains) that is more likely to be satisfactory.

In some implementations, domain module 104 may apply the collected contextual information (e.g., a current state) across one or more "domain selection" machine learning model(s) 105 that are distinct from the domain models described herein. These domain selection machine learning model(s) 105 may take various forms, such as various types of neural networks, support vector machines, random forests, BERT transformers, etc. In various implementations, domain selection machine learning model(s) 105 may be trained to select applicable domains based on attributes (or "contextual signals") of a current context or state of user 118 and/or client device 120. For example, if user 118 is operating a particular website's input form to procure a good or service, that website's uniform resource locator (URL), or attributes of the underlying webpage(s), such as keywords, tags, document object model (DOM) element(s), etc. may be applied as inputs across the model, either in their native forms or as reduced dimensionality embeddings. Other contextual signals that may be considered include, but are not limited to, the user's IP address (e.g., work versus home versus mobile IP address), time-of-day, social media status, calendar, email/text messaging contents, and so forth.

Interface module 106 may provide one or more graphical user interfaces (GUIs) that can be operated by various individuals, such as users 118-1 to 118-P, to perform various actions made available by semantic task guidance system 102. In various implementations, user 118 may operate a GUI (e.g., a standalone application or a webpage) provided by interface module 106 to opt in or out of making use of various techniques described herein. For example, users 118-1 to 118-P may be required to provide explicit permission before any tasks they perform using client device(s) 120-1 to 120-P are observed and used to generate guidance as described herein.

Additionally, interface module 106 may be configured to practice selected aspects of the present disclosure to present, or cause to be presented, guidance above performing semantic tasks in different domains. For example, interface module 106 may receive, from ML module 108, one or more sampled actions from an action space of a particular domain. Interface module 106 may then cause graphical and/or audio data indicative of these actions to be presented to a user.

Suppose a designer is operating a new computer-aided design (CAD) computer application, and that the designer previously operated an old CAD computer application, e.g., as part of their employment. Actions of a given task that the designer performed frequently using the old CAD computer application may be processed, e.g., by ML module 108 using a domain model associated with the old CAD computing application, to generate a domain-agnostic action embedding. This action embedding may then be translated, e.g., by ML module 108, into the domain of the new CAD computer application to generate (e.g., sample) one or more actions that can be performed using the new CAD computer application. These action(s) may be used by interface module 106 to generate audio and/or visual guidance to the user explaining how to perform the given task using the new CAD computer application.

ML module 108 may have access to data indicative of various global domain/machine learning models/policies in database 111. These trained global domain/machine learning models/policies may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network (e.g., LSTM, GRU, etc.), a BERT transformer network, a reinforcement learning policy, and any other type of machine learning model that may be applied to facilitate selected aspects of the present disclosure. ML module 108 may process various data based on these machine learning models at the request or command of other components, such as domain module 104 and/or interface module 106.

Task ID module 110 may be configured to analyze interactions between individuals and computer application(s) that are collected by semantic coordination agents 122 (described in more detail below). Based on those observations, task ID module 110 may determine which self-contained semantic tasks performed by individuals in one domain are likely to be performed, by the same individual or other individuals, in other domains. Put another way, task ID module 110 may selectively trigger the creation (e.g., by ML module 108) of domain-agnostic action embeddings that can then be used by ML module 108 to sample actions in different domains for purposes of providing semantic task guidance across those domains.

In some implementations, task ID module 110 may selectively trigger creation of domain-agnostic action embeddings on an individual basis. If a particular individual appears to perform the same semantic task in one domain repeatedly, then guidance for performing that semantic task in other domains may be provided to that individual specifically. Additionally or alternatively, task ID module 110 may selectively trigger creation of domain-agnostic action embeddings that are applicable across a population of individuals. If different individuals are observed—e.g., some threshold number of times, at a threshold frequency, etc.—performing the same semantic task across one or more domains, that may trigger task ID module 110 to generate domain-agnostic embedding(s). Interface module 106 and/or ML module 108 may then use these domain-agnostic embedding(s) to provide guidance for performing the semantic task to any number of different individuals.

In various implementations, task ID module 110 and/or semantic coordination agent 122 may only observe the individual's interactions with the individual's permission. For example, when installing (or updating) a computer application onto a particular client device 120, the semantic coordination agent 122 may solicit the individual's permission to observe the individual's interactions with the new computer application.

Each client device 120 may operate at least a portion of the aforementioned semantic coordination agent 122. Semantic coordination agent 122 may be a computer application that is operable by a user 118 to perform selected aspects of the present disclosure to facilitate extension of semantic tasks across disparate domains. For example, semantic coordination agent 122 may receive a request and/or permission from the user 118 to observe/record a sequence of actions performed by the user 118 using a client device 120 in order to complete some task. Without such an explicit request or permission, semantic coordination agent 122 may not be able to observe the user's interactions.

In some implementations, semantic coordination agent 122 may take the form of what is often referred to as a "virtual assistant" or "automated assistant" that is configured to engage in human-to-computer natural language dialog with user 118. For example, semantic coordination agent 122 may be configured to semantically process natural language input(s) provided by user 118 to identify one or more intent(s). Based on these intent(s), semantic coordination agent 122 may perform a variety of tasks, such as operating smart appliances, retrieving information, performing tasks, and so forth. In some implementations, a dialog between user 118 and semantic coordination agent 122 (or a separate automated assistant that is accessible to/by semantic coordination agent 122) may constitute a sequence of tasks that, as described herein, can be captured, abstracted into a domain-agnostic embedding, and then extended into other domains.

For example, a human-to-computer dialog between user 118 and semantic coordination agent 122 (or a separate automated assistant, or even between the automated assistant and a third-party application) to order a pizza from a first restaurant's third-party agent (and hence, a first domain) may be captured and used to generate an "order pizza" action embedding. This action embedding may later be extended to ordering a pizza from a different restaurant, e.g., via the automated assistant or via a separate interface.

In FIG. 1, each of client device(s) 120-1 may include a semantic coordination agent 122-1 that serves first user 118-1. First user 118-1 and his/her semantic coordination agent 122-1 may have access to and/or may be associated with a "profile" that includes various data pertinent to performing selected aspects of the present disclosure on behalf of first user 118-1. For example, semantic coordination agent 122 may have access to one or more edge databases or data stores associated with first user 118-1, including an edge database 124-1 that stores local domain model(s) and action embeddings, and/or another edge database 126-1 that stores recorded actions. Other users 118 may have similar arrangements. Any data stored in edge databases 124-1 and 126-1 may be stored partially or wholly on client devices 120-1, e.g., to preserve the privacy of first user 118-1. For example, recorded actions 126-1, which may include sensitive and/or personal information of first user 118-1 user such as payment information, address, phone numbers, etc., may be stored in its raw form locally on a client device 120-1.

The local domain model(s) stored in edge database 124-1 may include, for instance, local versions of global model(s) stored in global domain model(s) database 111. For example, in some implementations, the global models may be propagated to the edge for purposes of bootstrapping semantic coordination agents 122 to extend tasks into new domains associated with those propagated models; thereafter, the local models at the edge may or may not be trained locally based on activity and/or feedback of the user 118. In some such implementations, the local models (in edge databases 124, alternatively referred to as "local gradients") may be periodically used to train global models (in database 111), e.g., as part of a federated learning framework. As global models are trained based on local models, the global models may in some cases be propagated back out to other edge databases (124), thereby keeping the local models up to date.

However, it is not a requirement in all implementations that federated learning be employed. In some implementations, semantic coordination agents 122 may provide scrubbed data to semantic task guidance system 102, and ML module 108 may apply models to the scrubbed data remotely. In some implementations, "scrubbed" data may be data from which sensitive and/or personal information has been removed and/or obfuscated. In some implementations, personal information may be scrubbed, e.g., at the edge by semantic coordination automation agents 122, based on various rules. In other implementations, scrubbed data provided by semantic coordination agents 122 to semantic task guidance system 102 may be in the form of reduced dimensionality embeddings that are generated from raw data at client devices 120.

As noted previously, edge database 126-1 may store actions recorded by semantic coordination agent 122-1. Semantic coordination agent 122-1 may observe and/or record actions in a variety of different ways, depending on the level of access semantic coordination agent 122-1 has to computer applications executing on client device 120-1 and permissions granted by the user 118-1. For example, most smart phones include operating system (OS) interfaces for providing or revoking permissions (e.g., location, access to camera, etc.) to various computer applications. In various implementations, such an OS interface may be operable to provide/revoke access to semantic coordination agent 122, and/or to select a particular level of access semantic coordination agent 122 will have to particular computer applications.

Semantic coordination agent 122-1 may have various levels of access to the workings of computer applications, depending on permissions granted by the user 118, as well as cooperation from software developers that provide the computer applications. Some computer applications may, e.g., with the permission of a user 118, provide semantic coordination agent 122 with "under-the-hood" access to the applications' APIs, or to scripts writing using programming languages (e.g., macros) embedding in the computer applications. Other computer applications may not provide as much access. In such cases, semantic coordination agent 122 may record actions in other ways, such as by capturing screen shots, performing optical character recognition (OCR) on those screenshots to identify menu items, and/or monitoring user inputs (e.g., interrupts caught by the OS) to determine which graphical elements were operated by the user 118 in which order. In some implementations, semantic coordination agent 122 may intercept actions performed using a computer application from data exchanged between the computer application and an underlying OS (e.g., via system calls). In some implementations, semantic coordination agent 122 may intercept and/or have access to data exchanged between or used by window managers and/or window systems.

Figure 2:
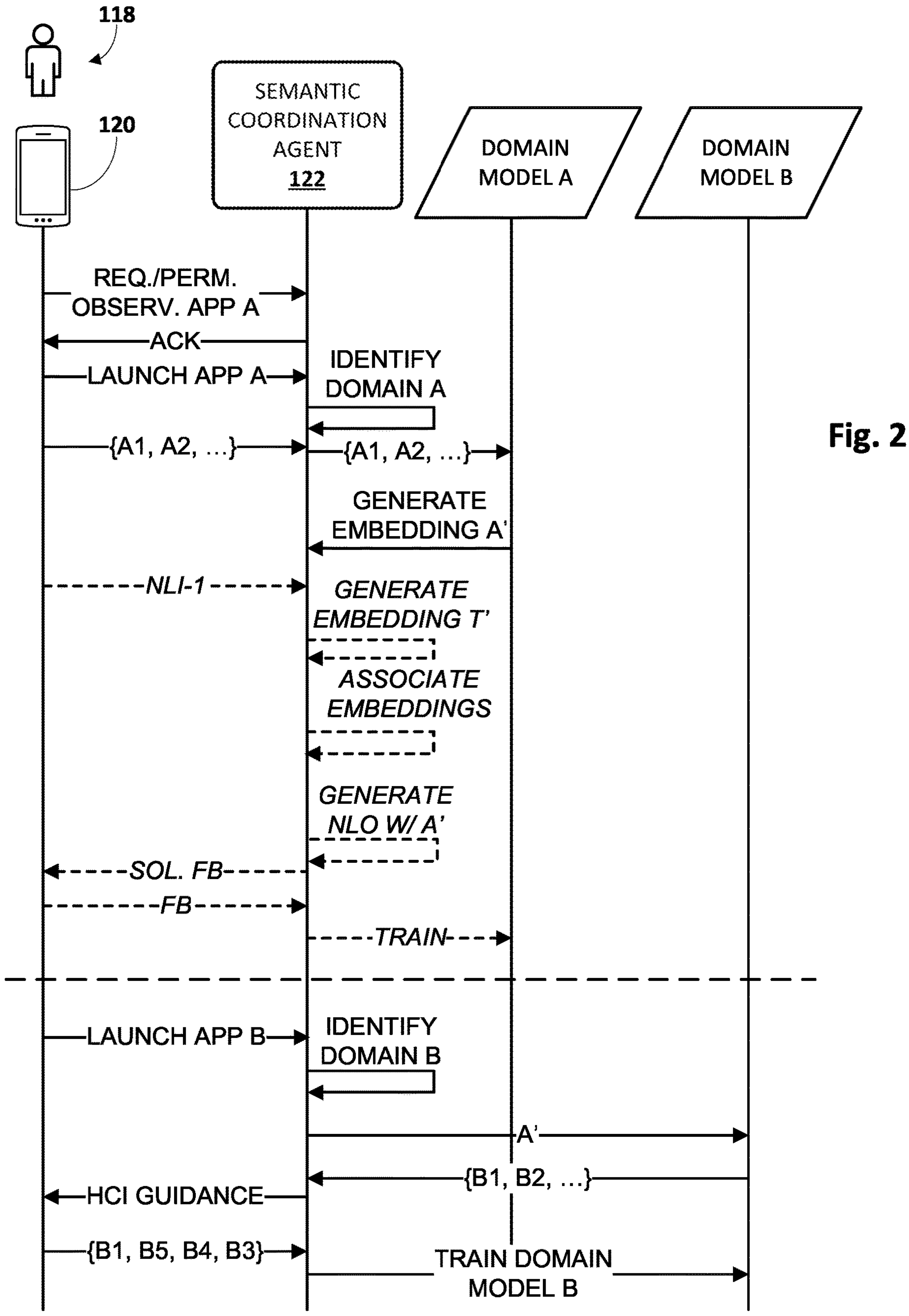
FIG. 2 schematically illustrates an example of how data may be exchanged and/or processed to extend a task performed in one domain into additional domains, in accordance with various implementations.

FIG. 2 schematically depicts an example of how data may be processed and/or used by various components across multiple domains. Starting at top left, a user 118 operates a client device 120 to request or provide permission for semantic coordination agent 122 operating at least in part on client device 120 to observe interactions of user 118 with a first computer application, APP A. In various implementations, semantic coordination agent 122 is unable to record actions without receiving this permission. In some implementations, this permission may be granted on an application-by-application basis, much in the way applications are granted permission to access GPS coordinates, local files, use of an onboard camera, etc. In other implementations, this permission may be granted only until user 118 says otherwise, e.g., by pressing a "stop recording" button akin to recording a macro, or by providing a speech input such as "stop recording" or "that's it."

Once the request/permission is received, in some implementations, semantic coordination agent 122 may acknowledge (ACK) the request/permission, although this is not required. Sometime later, user 118 may launch APP A and perform a sequence of actions {A1, A2, . . . } in domain A using client device 120; these actions may be captured and stored in edge database 126. These actions {A1, A2, . . . } may take various forms or combinations of forms, such as command line inputs, as well as interactions with graphical element(s) of one or more GUIs using various types of inputs, such as pointer device (e.g., mouse) inputs, keyboard inputs, speech inputs, gaze inputs, and any other type of input capable of interacting with a graphical element of a GUI.

In some implementations, groups of actions performed together logically, e.g., within a particular time interval, without interruption, etc., may be grouped together as a semantic task, e.g., by task ID module 110. For example, the user may perform actions A1-A6 during one session, stop interacting with APP A for some period of time, and then perform actions A7-A15 later. In various implementations, actions A1-A6 may be grouped together as one semantic task and actions A7-A15 may be grouped together as another semantic task.

In various implementations, the domain (A) in which these actions are performed may be identified, e.g., by domain module 104, using any number of signals, such as the fact that user 118 launched APP A, as well as other signals where available. These other signals may include, for instance, natural language input (NLI) provided by the user, a calendar of the user, electronic correspondence of the user, social media posts of the user, etc.

In various implementations, semantic coordination agent 122 may observe/record actions {A1, A2, . . . } and pass them (or data indicative thereof, such as reduced-dimensionality embeddings) to another component, such as ML module 108 (not depicted in FIG. 2). ML module 108 may then process these actions using all or part of a domain model A to generate a domain-agnostic action embedding A' (also referred to as an "intermediate representation"). In various implementations, the domain model A may include an encoder portion, e.g., of a larger encoder-decoder architecture, that can be used to process a sequence of tokens (e.g., actions {A1, A2, . . . }) to generate an intermediate representation, e.g., action embedding A'.

In some implementations, and as indicated by the dashed lines, user 118 may optionally provide NLI−1 to describe what user 118 is doing when performing actions {A1, A2, . . . }. This NLI−1 may be captured by semantic coordination agent 122, which may pass it to ML module 108 for natural language processing to generate a task embedding T'. Task embedding T' may be used to provide additional context for actions {A1, A2, . . . }. This additional context may be used in various ways, such as additional inputs for domain models, or as an anchor to allow semantically similar actions to be requested (by user 118 or someone else) in the future. As shown in the dashed lines, in some implementations, the task embedding T's and the action embedding A' may be associated with each other, e.g., in a database, via a shared/joint embedding space, etc.

In some implementations, if user 118 does not provide natural language input describing the actions {A1, A2, . . . }, semantic coordination agent 122 may formulate (or cause to be formulated) a predicted description of the action(s) and then solicit feedback from user 118 about the description's accuracy or quality. In FIG. 2, for example, additional dashed arrows show how semantic coordination agent 122 has generated natural language output (NLO) using the action embedding A', e.g., by processing (or causing to be processed) embedding A' using a semantic decoder machine learning mode trained to translate between a domain-agnostic action embedding space and a natural language vocabulary. Semantic coordination agent 122 may then present this natural language output to user 118 as part of a solicitation for feedback ("SOL. FB" in FIG. 2). User 118 may provide feedback (e.g., "Yes, that's correct," or "No, you're wrong."). Based on that feedback, semantic coordination agent 122 may train, or cause to be trained, domain model A.

As delineated by the horizontal dashed line, sometime later, user 118 launches APP B, which causes semantic coordination agent 122 to identify domain B as the active domain. In various implementations, semantic coordination agent 122 may cause action embedding A' to be processed, e.g., by ML module 108, using a domain model B. For example, action embedding A' may be processed using a decoder portion of an encoder-decoder network that collectively forms or is associated with domain B. This decoding may, for instance, generate probability distributions across the action space of domain B. Based on these probability distributions, various actions {B1, B2, . . . } selected from the action space of domain B may be generated and provided to semantic coordination agent 122. Semantic coordination agent 122 may then cooperate with interface module 106 (not depicted in FIG. 2) to generate HCI guidance for user 118.

In various implementations, components such as semantic coordination agent 122 and ML module 108 may continually train domain models on an ongoing basis, e.g., to improve the quality of HCI guidance that is provided, enable the HCI guidance to be more narrowly tailored to particular contexts, etc. Suppose that when presented with this HCI guidance, user 118 follows some parts of the guidance, but not other parts, and in a different order. For example, suppose the HCI guidance was to perform the actions {B1, B2, B3, B4, B5, B6, B7} in order, whereas in FIG. 2, user 118 performs less than all of the actions, and in a different order: {B1, B5, B4, B3}. In some implementations, the difference between the recommended actions {B1, B2, B3, B4, B5, B6, B7} and the actions user 118 ultimately performed, {B1, B5, B4, B3}, may be used as an error that can then be used, e.g., by ML module 108, to train domain model B, e.g., using techniques such as gradient descent, back propagation, etc.

FIGS. 3A-3D depict examples of how components such as semantic coordination agent 122 may perform, or cause to be performed, selected aspects of the present disclosure to provide guidance for performing a semantic task in a new domain. For this example, it should be assumed that the user (not depicted) is operating an HCI 360 in the form of a GUI rendered by or on behalf of a "Hypothetical CAD" computer application. It should be assumed further that the user previously worked with a different CAD computer application (e.g., as part of the user's employment) called "FakeCAD" to perform any number of tasks repeatedly. Finally, it should be assumed that the user has transitioned recently from using FakeCAD to using Hypothetical CAD (e.g., as a result of taking a new job).

Figure 3A:
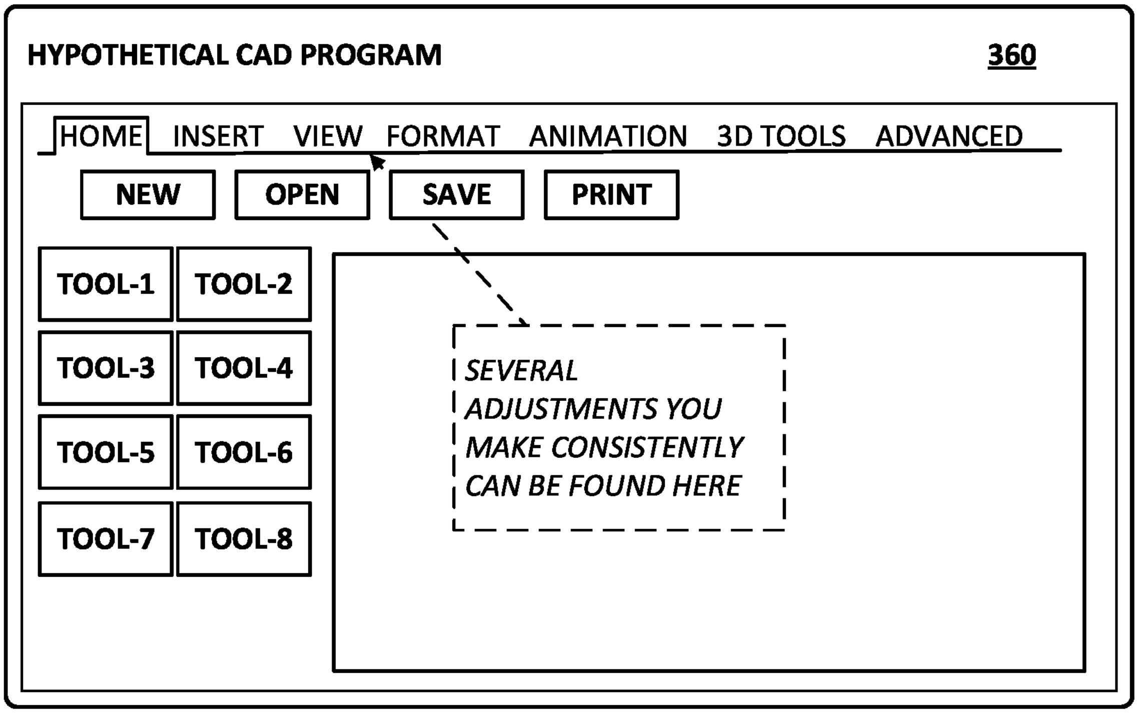
FIG. 3A, FIG. 3B, FIG. 3C, and FIG. 3D illustrate an example of how techniques described herein may be used to provide guidance for interacting with a computer application, in accordance with various implementations.

In FIG. 3A, the HCI is in a home state where the "HOME" menu item is active. Consequently, context-specific menu items such as "New," "Open," "Save," and "Print" are active. These are merely examples of what might be presented and are not meant to be limiting. On the left are a number of design tools (1-8) that may include tools commonly found in CAD programs generally, such as tools for drawing lines, ellipses, circles, shape filling tools, different brushes, etc.

In this example, domain-specific actions performed previously by the user when operating the previous CAD software, FakeCAD, to perform various semantic tasks have been processed to generate domain-agnostic action embeddings. In particular, a domain model trained to translate to/from an action space associated with FakeCAD was used to process these domain-specific actions into domain-agnostic action embeddings. One or more of these domain-agnostic action embeddings were then processed, e.g., by ML module 108, using a domain model configured to translate to/from an action space associated with the new software, Hypothetical CAD.

The output of the processing using the domain model for Hypothetical CAD may include probability distribution(s) over actions in the action space of Hypothetical CAD. Based on these probability distributions, ML module 108 or semantic coordination agent 122 may select one or actions in the action space of Hypothetical CAD. These selected action(s) may then be used, e.g., by interface module 106, to generate HCI guidance that helps the user navigate HCI 360 to perform tasks they performed previously using FakeCAD.

Figure 3B:
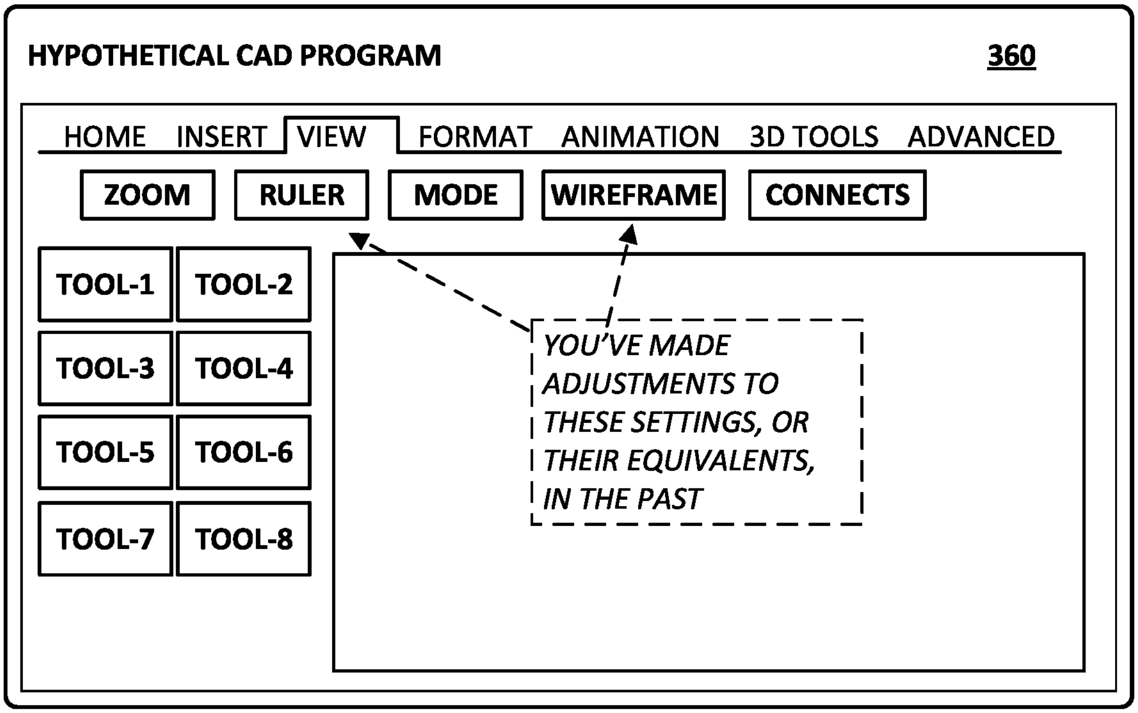

For example, in FIG. 3A, HCI guidance is being presented in the form of an overlaid annotation that points to the "View" menu and explains, "Several adjustments you make consistently can be found here." Once the user selects the "View" menu as suggested, HCI 360 may transition into the state depicted in FIG. 3B.

In FIG. 3B, the "View" menu is now active, which causes several context-specific menu items to appear. "Zoom," "Ruler," "Mode," "Wireframe," and "Connects" are merely illustrative examples of what might be presented and are not meant to be limiting. New HCI guidance is now provided, urging the user to interact with the "Ruler" menu item and the "Wireframe" menu item. This may be because, for instance, the user had a habit of frequently adjusting similar parameters when using FakeCAD in the past.

Figure 3C:
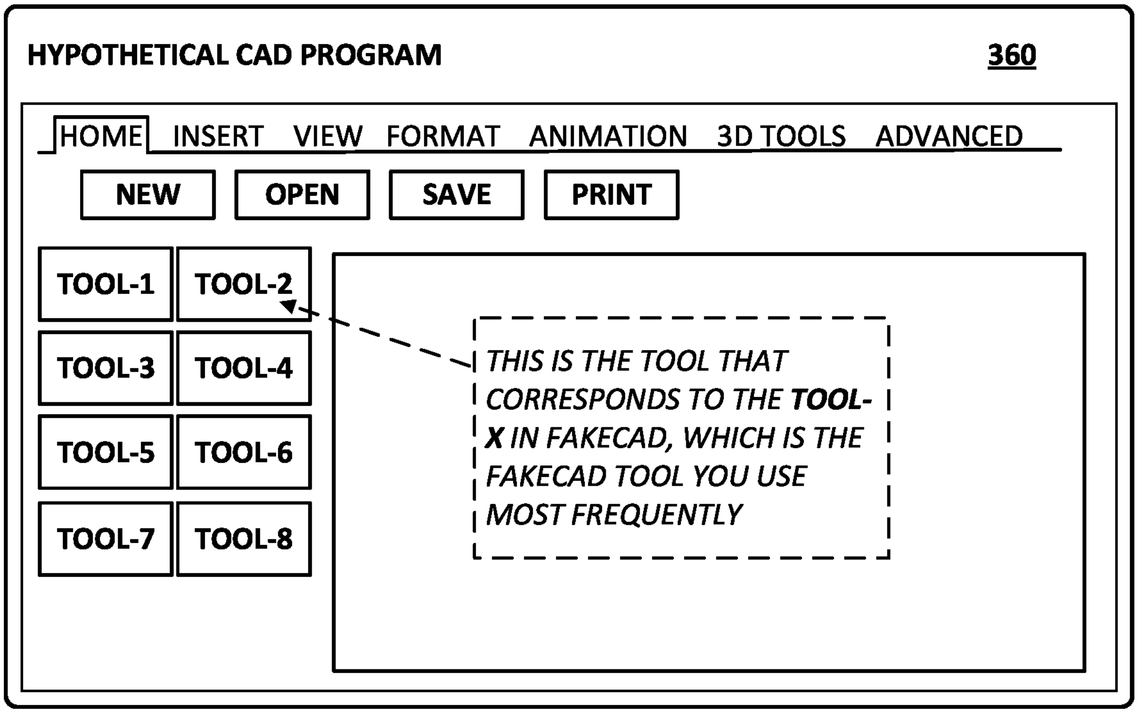

In FIG. 3C, the "Home" menu is once again active. Now, the user is presented with additional HCI guidance related to "Tool-2." In particular, the user is informed via an overlaid annotation that "This is the tool that corresponds to the tool-x in FakeCAD, which is the FakeCAD tool you use most frequently." The user may be presented with this HCI guidance at various times, such as subsequent to the HCI guidance presented in FIGS. 3A-B because, for instance, the HCI guidance presented previously in FIGS. 3A-B corresponded to actions the user generally performed earlier (e.g., setting general parameter). Contrastly, the HCI guidance presented in FIG. 3C may correspond to actions that the user traditionally performed later, e.g., after the user had the general parameters set to their liking and was ready to work.

Figure 3D:
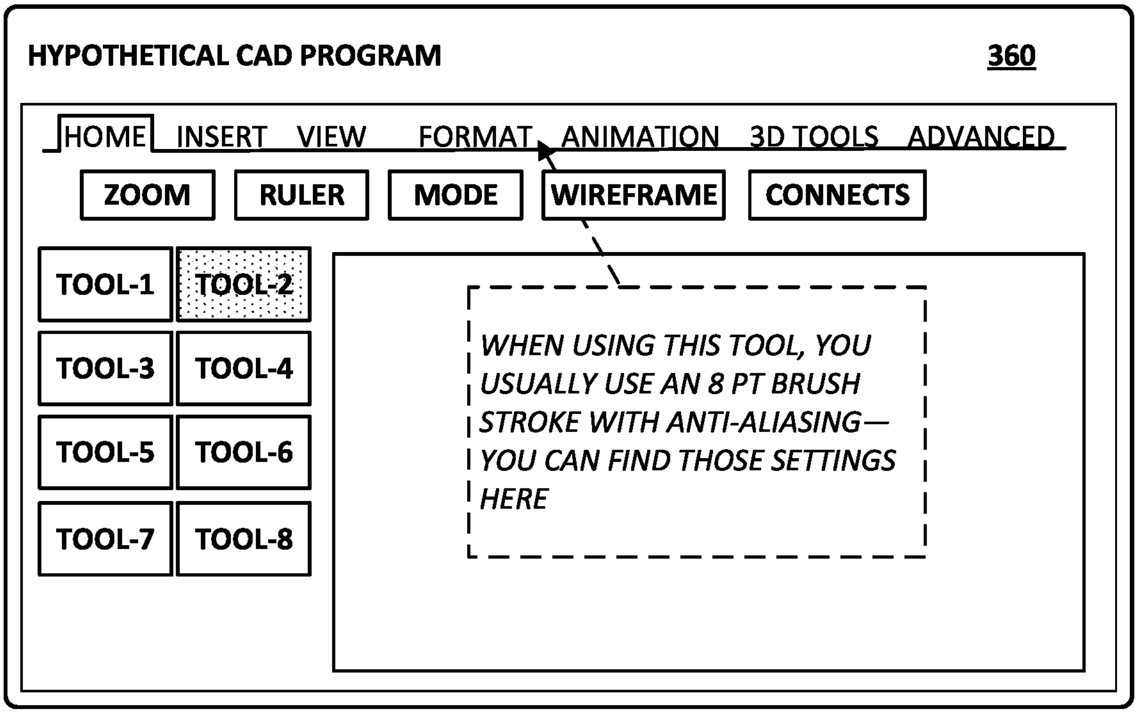

FIG. 3D depicts a next iteration of HCI guidance that may be presented, e.g., once the user has selected Tool-2 (as indicated by the shading in FIG. 3D). Here, the HCI guidance once again is an overlaid visual annotation that points to the "Format" menu and informs the user, "When using this tool, you usually use an 8 pt brush stroke with anti-aliasing—you can find those settings here." If the user were to select the "Format" menu, then one or more graphical elements would presumably become available for the user to select a brush stroke size.

Figure 4:
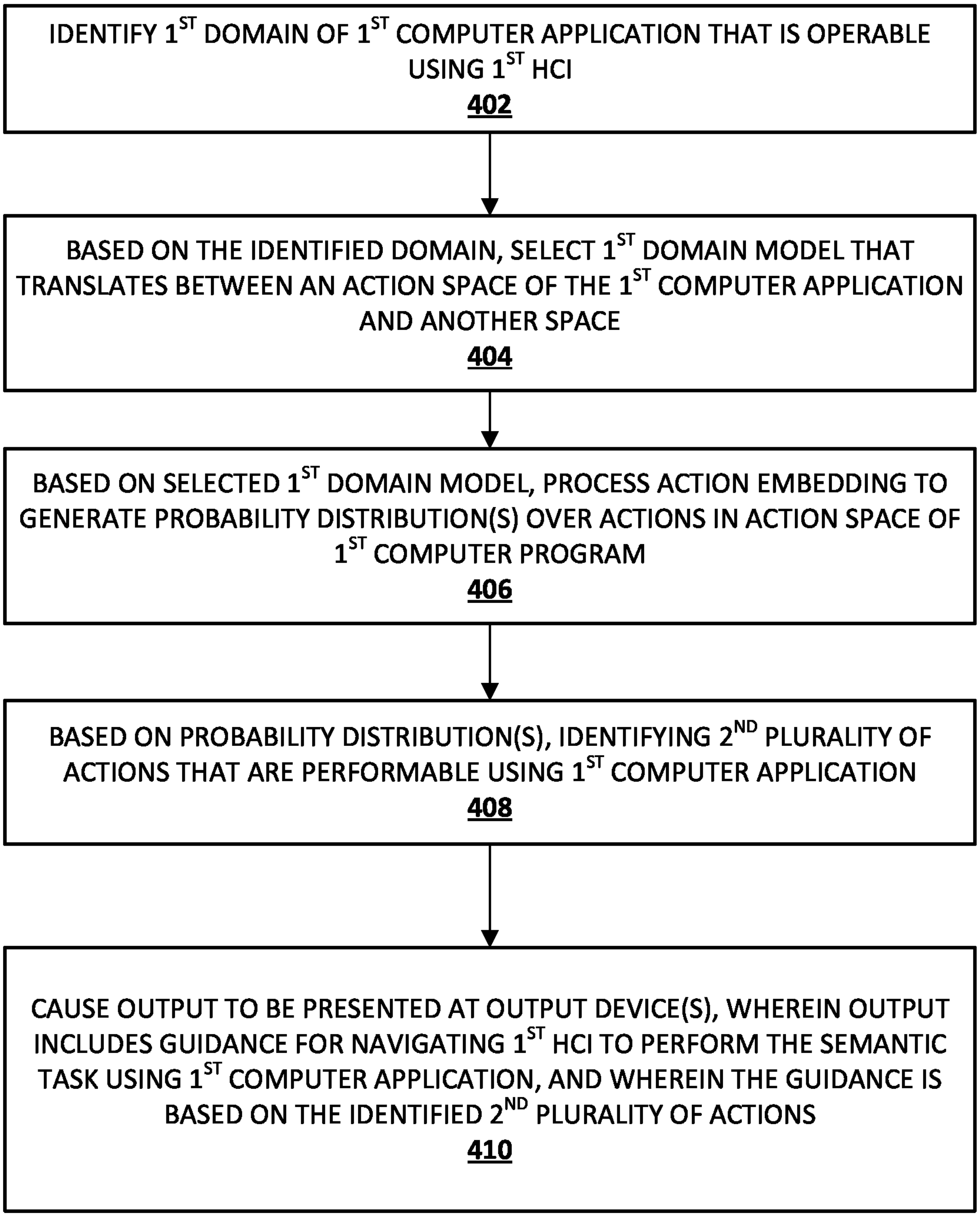
FIG. 4 is a flowchart illustrating an example method of practicing selected aspects of the present disclosure, according to implementations disclosed herein.

FIG. 4 is a flowchart illustrating an example method 400 for practicing selected aspects of the present disclosure, according to implementations disclosed herein. For convenience, the operations of the flow chart are described with reference to a system that performs the operations. This system may include various components of various computer systems, such as one or more components of semantic task guidance system 102. Moreover, while operations of method 400 are shown in a particular order, this is not meant to be limiting. One or more operations may be reordered, omitted or added.

At block 402, the system, e.g., by way of domain module 104, may identify a first domain of a first computer application that is operable using a first HCI. For example, in FIG. 3A, the fact that the user launched Hypothetical CAD may cause domain module 104 to identify the Hypothetical CAD domain as being active. As noted previously, domain module 104 may use any number of signals, in addition to or instead of a computer application, to identify a current domain. For example, if the user is operating an HMD to explore a virtual reality universe sometimes referred to as a "metaverse," then an area of the metaverse that the user is currently exploring may be used to identify the domain.

Based on the domain identified at block 402, at block 404, the system, e.g., by way of semantic coordination agent 122 or ML module 108, may select a first domain model that translates between an action space of the first computer application and another space. For example, in FIGS. 3A-D, ML module 108 selected the Hypothetical CAD domain model.

Based on the selected first domain model, at block 406, the system, e.g., by way of ML module 108, may process a domain-agnostic action embedding to generate one or more probability distributions over actions in the action space of the first computer program. The action embedding may represent a plurality of actions performed previously using a second HCI of a second computer application to perform a semantic task. This was demonstrated in FIGS. 3A-D, where the domain-agnostic action embedding was generated previously based on the user's interactions with an HCI of the previous software, FakeCAD, and that domain-agnostic action embedding was processed using the domain model of Hypothetical CAD to generate probability distribution(s) over an action space of Hypothetical CAD.

Based on the one or more probability distributions generated at block 406, at block 408, the system, e.g., by way of ML module 108 or semantic coordination agent 122, may identify a second plurality of actions that can be performed using the first computer application. At block 410, the system, e.g., by way of interface module 106, may cause output to be presented at one or more output devices. The output may include guidance for navigating the first HCI to perform the semantic task using the first computer application. The guidance may be generated, e.g., by interface module 106, based on the identified second plurality of actions that can be performed using the first computer application. HCI guidance may come in various forms.

Visually, it may be presented as overlaid annotations (e.g., as shown in FIGS. 3A-D), animations, videos, written natural language output (e.g., text balloons), 3D renderings (e.g., in a virtual reality or metaverse setting), and so forth. Audibly, HCI guidance may be presented as natural language output, various noises or sound effects, etc.

Examples described herein have focused primarily on providing HCI guidance across semantically similar computer applications, such as between the CAD computer applications FakeCAD and Hypothetical CAD, or between different spreadsheet applications. However, this is not meant to be limiting. To the extent a particular semantic task is relatively agnostic towards particular domains, that task may be used to generate actions in any number of domains that are otherwise dissimilar. For example, setting a particular computer application to "dark mode" may be relatively universal, and therefore may be leveraged to provide HCI guidance across various domains, such as other computer applications, or even operating systems.

As another example, automated assistants (sometimes referred to as "virtual" assistants" or "virtual agents") may interface with any number of third-party agents to allow the automated assistant to act as a liaison for performing tasks such as ordering goods or services, making reservations, booking ride shares, and so forth. Different companies that provide similar services (e.g., ride sharing) may require users to interact with their respective third-party agents using natural language dialog. However, the natural language dialog that is usable to interact with a first ride sharing agent may be different than the dialog used to interact with a second ride sharing agent. Nonetheless, the ultimate parameters or "slot values" that are filled to complete a ride sharing request may be semantically similar, even if they are named differently, requested at different points during the conversation, etc. Accordingly, techniques described herein may be used to provide a user with HCI guidance, e.g., as audible or visual natural language, graphical elements on a display, etc., that can help the user accustomed to the first ride sharing agent to more efficiently interact with the second ride sharing agent. For example, a domain-agnostic action embedding may be processed to generate a script for the automated agent that acts as the liaison. This script may solicit the necessary parameters or slot values from the user in a domain-agnostic fashion. Then, the automated agent may use these solicited values to engage with any ride sharing agent, without requiring the user to learn each agent's nuances.

Figure 5:
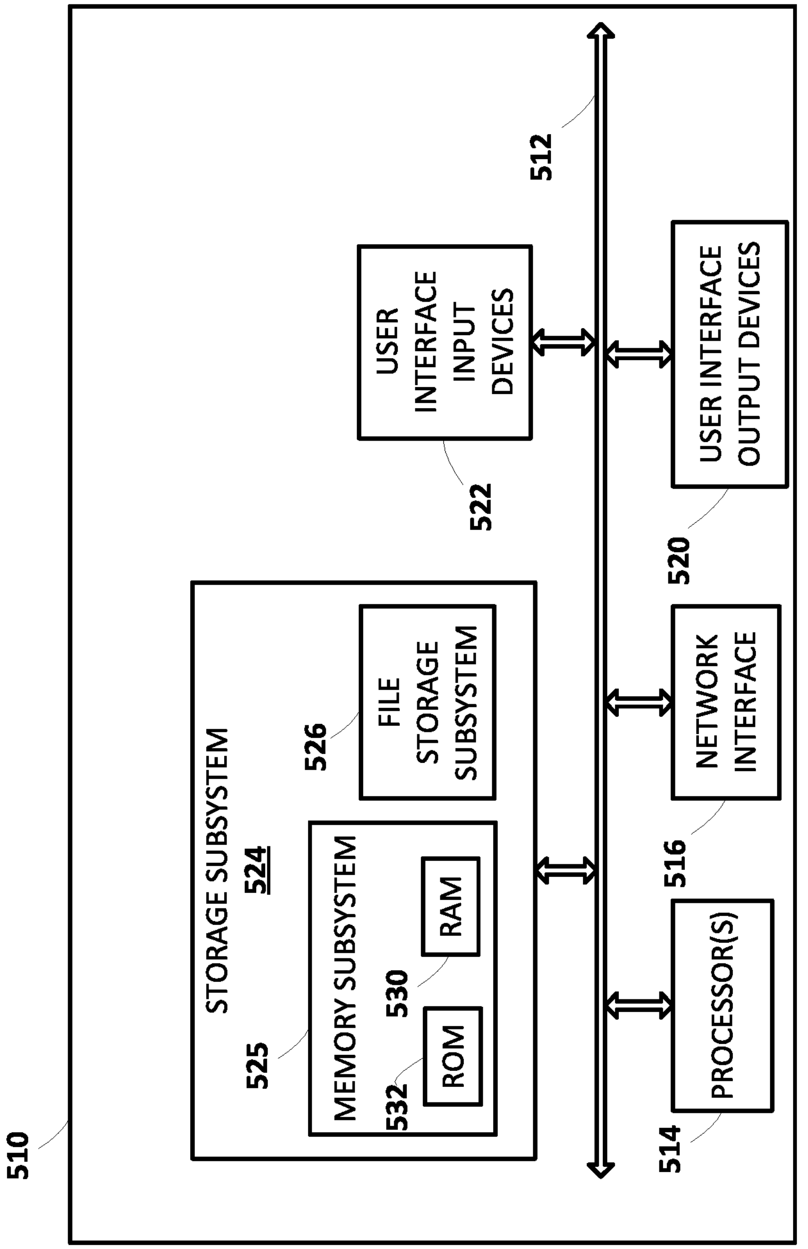
FIG. 5 illustrates an example architecture of a computing device.

FIG. 5 is a block diagram of an example computing device 510 that may optionally be utilized to perform one or more aspects of techniques described herein. In some implementations, one or more of the client computing devices 120-1 to 120-P, semantic task guidance system 102, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method 400 of FIG. 4.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

determining a first task to be performed by a user using a first computer application;

identifying a domain of the first computer application that is operable using a first human-computer interface (HCI);

based on the identified domain, selecting a domain model that translates between an action space of the first computer application and another space;

based on the selected domain model, processing an action embedding to generate one or more probability distributions over actions in the action space of the first computer application, wherein the action embedding represents a plurality of actions performed previously using a second HCI of a second computer application that is different from the first computer application to perform a second task that is semantically equivalent to the first task;

based on the one or more probability distributions, identifying a second plurality of actions that are performable using the first computer application; and causing output to be presented at one or more output devices, wherein the output includes guidance for navigating the first HCI to perform the first task using the first computer application, and wherein the guidance is based on the identified second plurality of actions that are performable using the first computer application.

2. The method of claim 1, wherein the domain model is trained to translate between the action space of the first computer application and a domain-agnostic action embedding space.

3. The method of claim 1, wherein the domain model is trained to translate directly between the action space of the first computer application and an action space of the second computer application.

4. The method of claim 1, wherein the first HCI comprises a graphical user interface (GUI).

5. The method of claim 4, wherein the guidance for navigating the first HCI includes one or more visual annotations that overlay the GUI.

6. The method of claim 5, wherein one or more of the visual annotations are rendered to call attention to one or more graphical elements of the GUI.

7. The method of claim 1, wherein the guidance for navigating the first HCI includes one or more natural language outputs.

8. The method of claim 1, further comprising:

obtaining user input that conveys the first task; and identifying the action embedding based on the first task.

9. The method of claim 8, wherein the user input comprises natural language input, and the method further comprises:

performing natural language processing (NLP) on the natural language input to generate a first task embedding that represents the first task; and determining a similarity measure between the first task embedding and the action embedding;

wherein the action embedding is processed based on the similarity measure.

10. A system comprising one or more processors and memory storing instructions that, in response to execution of the instructions, cause the one or more processors to:

determine a first task to be performed by a user using a first computer application;

identify a domain of the first computer application that is operable using a first human-computer interface (HCI);

based on the identified domain, select a domain model that translates between an action space of the first computer application and another space;

based on the selected domain model, process an action embedding to generate one or more probability distributions over actions in the action space of the first computer application, wherein the action embedding represents a plurality of actions performed previously using a second HCI of a second computer application that is different from the first computer application to perform a second task that is semantically equivalent to the first task;

based on the one or more probability distributions, identify a second plurality of actions that are performable using the first computer application; and cause output to be presented at one or more output devices, wherein the output includes guidance for navigating the first HCI to perform the first task using the first computer application, and wherein the guidance is based on the identified second plurality of actions that are performable using the first computer application.

11. The system of claim 10, wherein the domain model is trained to translate between the action space of the first computer application and a domain-agnostic action embedding space.

12. The system of claim 10, wherein the domain model is trained to translate directly between the action space of the first computer application and an action space of the second computer application.

13. The system of claim 10, wherein the first HCI comprises a graphical user interface (GUI).

14. The system of claim 13, wherein the guidance for navigating the first HCI includes one or more visual annotations that overlay the GUI.

15. The system of claim 14, wherein one or more of the visual annotations are rendered to call attention to one or more graphical elements of the GUI.

16. The system of claim 10, wherein the guidance for navigating the first HCI includes one or more natural language outputs.

17. The system of claim 10, further comprising instructions to:

obtain user input that conveys the first task; and identify the action embedding based on the first task.

18. The system of claim 17, wherein the user input comprises natural language input, and the system further comprises instructions to:

perform natural language processing (NLP) on the natural language input to generate a first task embedding that represents the first task; and determine a similarity measure between the first task embedding and the action embedding;

wherein the action embedding is processed based on the similarity measure.

19. A non-transitory computer-readable medium comprising instructions that, in response to execution of the instructions by a processor, cause the processor to:

determine a first task to be performed by a user using a first computer application;

identify a domain of the first computer application that is operable using a first human-computer interface (HCI);

based on the identified domain, select a domain model that translates between an action space of the first computer application and another space;

based on the selected domain model, process an action embedding to generate one or more probability distributions over actions in the action space of the first computer application, wherein the action embedding represents a plurality of actions performed previously using a second HCI of a second computer application that is different from the first computer application to perform a second task that is semantically equivalent to the first task;

based on the one or more probability distributions, identify a second plurality of actions that are performable using the first computer application; and cause output to be presented at one or more output devices, wherein the output includes guidance for navigating the first HCI to perform the first semantic task using the first computer application, and wherein the guidance is based on the identified second plurality of actions that are performable using the first computer application.

20. The computer-readable medium of claim 19, wherein the domain model is trained to translate between the action space of the first computer application and a domain-agnostic action embedding space.

* * * * *